United States Patent [19]

Vollrath et al.

[11] Patent Number: 5,489,089
[45] Date of Patent: Feb. 6, 1996

[54] AUTOMATIC ALIGNMANT VISE

[75] Inventors: Kris Vollrath, Greenfield, Ind.; Shane Bendele, Columbus, Ohio; Chris Recker, Glandorf, Ohio; Chad Weaver, North Canton, Ohio; Eric McWhorter, Columbus, Ohio; Jamie Cree, Junction City, Ohio; Adam Park, Cridersville, Ohio; Kirby Harder; Sean Jeric, both of Ada, Ohio; Michael Vaughn, Chardon, Ohio; Charles A. Shearrow, Ada, Ohio

[73] Assignee: Ohio Northern University, Ada, Ohio

[21] Appl. No.: 233,886

[22] Filed: Apr. 26, 1994

[51] Int. Cl.$^6$ ............................ B25B 1/24; B23Q 1/04
[52] U.S. Cl. ........................ 264/71; 269/73; 269/283; 269/238
[58] Field of Search ........................ 269/61, 63, 71, 269/73, 45, 279, 283, 238; 414/749, 751; 901/16, 22, 31, 39

[56] References Cited

U.S. PATENT DOCUMENTS

| | | |
|---|---|---|
| 4,317,560 | 3/1982 | Troyer ............................ 269/61 |
| 4,401,406 | 8/1983 | Rovira . |
| 4,437,654 | 3/1984 | Chiappetti ............................ 269/283 |
| 4,457,664 | 7/1984 | Judell et al. . |
| 4,558,856 | 12/1985 | Shaffer ............................ 269/277 |
| 4,579,321 | 4/1986 | Kawano . |
| 4,607,578 | 8/1986 | Inoue et al. ............................ 269/61 |
| 4,721,005 | 1/1988 | Yoshiji et al. . |
| 4,948,330 | 8/1990 | Nomura et al. . |
| 4,962,917 | 10/1990 | Tamura et al. . |
| 4,976,484 | 12/1990 | Nomura et al. . |
| 5,037,075 | 8/1991 | Durfee ............................ 269/279 |
| 5,061,144 | 10/1991 | Akimoto et al. . |
| 5,100,286 | 3/1992 | Anderson . |

*Primary Examiner*—Robert C. Watson
*Attorney, Agent, or Firm*—Andrew Beckerman-Rodau

[57] ABSTRACT

An automatic alignment vise capable of automatically precisely positioning a workpiece to be machined. The vise can provide precise three dimensional positioning in response to data signals provided by a robotic device, a vertical milling machine or other machining device. The vise allows precise machining of all faces of the workpiece.

24 Claims, 3 Drawing Sheets

5,489,089

AUTOMATIC ALIGNMANT VISE

BACKGROUND

This invention relates to apparatus for three-dimensional positioning of a workpiece for machining by a robotic device, vertical milling machine or other machining equipment.

Improper positioning of a workpiece can result in automated machining being performed incorrectly. Precise positioning of a workpiece is critical to achieving proper automated machining by modern computer controlled machining equipment. Existing positioning methods involve complex equipment that utilizes multiple servo motors, gears, belts and/or tracks. Such equipment is prone to failure and misalignment. Additionally, in many cases the ability to machine all surfaces of a workpiece is limited.

SUMMARY

This invention overcomes the shortcomings of existing workpiece positioning apparatus. The invention allows rapid and precise three dimensional automatic positioning of a workpiece to be achieved. Typically, a positioning device, such as a robotic device, must precisely place a workpiece for machining. This invention allows the positioning device to provide less than precise positioning of the workpiece without effecting subsequent machining. After placement of a workpiece by a positioning device in applicants' automatic alignment vise the vise can quickly move the workpiece to its precise location for machining. This allows less precise and less expensive robotic positioning apparatus to be utilized without effecting precise machining of the workpiece. Additionally, the invention allows the workpiece to be rotated 360 degrees so that all but two sides of the workpiece can be precisely machined without removing the workpiece from the automatic alignment vise. A positioning device can then remove the workpiece from the vise, rotate it and replace it in the vise. This allows the remaining two workpiece surfaces to be machined.

In general, the invention features, in one aspect, an automatic alignment vise which includes: Z-axis apparatus for positioning a workpiece along a Z-axis such that the Z-axis apparatus supports the workpiece; Y-axis apparatus for positioning the workpiece along a Y-axis such that the Y-axis apparatus, in response to an actuation signal, positions the workpiece supported by the Z-axis apparatus, along the Y-axis without substantially changing the Z-axis position; X-axis apparatus for positioning the workpiece along an X-axis such that the X-axis apparatus, in response to an actuation signal, positions the workpiece along the X-axis without substantially changing the Z-axis and the Y-axis positions; and rotational apparatus for rotating the workpiece around the X-axis such that the rotational apparatus, in response to an actuation signal, rotates the workpiece around the X-axis.

In a particular embodiment of the automatic alignment vise the Z-axis apparatus includes at least two alignment jaws and each alignment jaw has a surface for supporting the workpiece.

In other embodiments of the automatic alignment vise the Z-axis apparatus includes interchangeable alignment jaws so that different alignment jaws can be used to position the workpiece in different positions along the Z-axis; each of the alignment jaws has a stepped surface that includes a substantially flat lower workpiece support surface which is located so that the lower workpiece support surface of each alignment jaw faces each other.

In further embodiments of the automatic alignment vise the Y-axis apparatus includes a scissor alignment mechanism capable of holding the workpiece and moving the workpiece along the Y-axis; the scissor alignment mechanism includes at least two scissor arms pivotally connected together so that one end of each scissor arm is connected to scissor actuation apparatus for moving the scissor arms relative to one another; the portion of each scissor arm located on the opposite side of the pivot connection from the scissor actuation apparatus supporting the Z-axis apparatus are capable of holding the workpiece and moving the workpiece along the Y-axis; the Z-axis apparatus includes at least two alignment jaws which each have surfaces for supporting the workpiece; each of the alignment jaws has a stepped surface that includes a substantially flat lower workpiece support surface which is located so that the lower workpiece support surface of each alignment jaw faces each other; each of the alignment jaws are interchangeable such that different alignment jaws can be used to position the workpiece in different positions along the Z-axis; the scissor actuation apparatus is a pneumatic cylinder; the scissor actuation apparatus is a double acting pneumatic cylinder; the scissor actuation apparatus is a hydraulic cylinder; the X-axis apparatus includes a pneumatic cylinder; the X-axis apparatus further includes a pneumatic cylinder pressure plate affixed to the pneumatic cylinder shaft so that the pneumatic cylinder pressure plate is positioned to push the workpiece to a location along the X-axis; the X-axis apparatus further includes a fixed pressure plate which stops the motion of the workpiece along the X-axis in response to action of the pneumatic cylinder pressure plate so that the workpiece is pressed between the pneumatic cylinder pressure plate and the fixed pressure plate; the rotational apparatus includes rotational apparatus affixed to the fixed pressure plate so that the fixed pressure is capable of rotating in response to rotation of the rotational apparatus and the pneumatic cylinder pressure plate is capable of freely rotating around the X-axis such that rotation of the rotational apparatus rotates the workpiece around the X-axis; the rotational apparatus is a servo motor.

In general, the invention features, in another aspect, an automatic alignment vise which includes at least two alignment jaws. Each of the alignment jaws has a surface for supporting a workpiece and positioning it along a Z-axis. It also includes a scissor alignment mechanism capable of gripping the workpiece and positioning the workpiece along a Y-axis so that the scissor alignment mechanism, in response to an actuation signal, positions the workpiece supported by the alignment jaws along the Y-axis without substantially changing the Z-axis position. The scissor alignment mechanism includes at least two scissor arms pivotally connected so that one end of each scissor arm is connected to scissor actuation apparatus for moving the scissor arms relative to one another. The portion of each scissor arm located on the opposite side of the pivot connection from the scissor actuation apparatus supports the alignment jaws such that the scissor actuation apparatus, upon actuation, moves the ends of the scissor arms it is connected to away from each other causing the portion of each scissor arm located on the opposite side of the pivot connection from the scissor actuation apparatus to move toward each other. This also causes the alignment jaws supported by the scissor arms to grip the workpiece and position it along the Y-axis. It further includes X-axis positioning apparatus that has a linear motion device capable of moving the workpiece along an X-axis in response to an actuation signal without substantially changing the Z-axis and Y-axis positions. The workpiece comes in contact with a fixed pressure plate which stops the motion of the workpiece along the X-axis in response to the linear motion device moving the workpiece along the X-axis so that the workpiece is pressed between the fixed pressure plate and the linear motion device. It still further includes rotational apparatus capable of rotating the workpiece around the X-axis in response to an actuation signal. The rotational apparatus includes a rotating device affixed to the fixed pressure plate for rotating the fixed pressure plate around the X-axis. The fixed pressure plate is capable of freely rotating around the X-axis. The rotational apparatus further includes a linear motion device pressure plate which is capable of freely rotating around the X-axis so that rotation of the rotational apparatus rotates the workpiece pressed between the fixed pressure plate and the linear motion device pressure plate.

In other embodiments of the automatic alignment vise the alignment jaws are interchangeable such that different alignment jaws can be used to position the workpiece in different positions along the Z-axis; the scissor actuation apparatus is a pneumatic cylinder; the scissor actuation apparatus is a double acting pneumatic cylinder; the scissor actuation apparatus is a hydraulic cylinder; the linear motion device is a pneumatic cylinder; the linear motion device is a hydraulic cylinder; the rotational apparatus is a servo motor.

All the features and advantages of the invention will be apparent from the following description and from the claims. For a full understanding of the present invention, reference should now be made to the following description and the accompanying drawings.

DESCRIPTION

Figure 1:
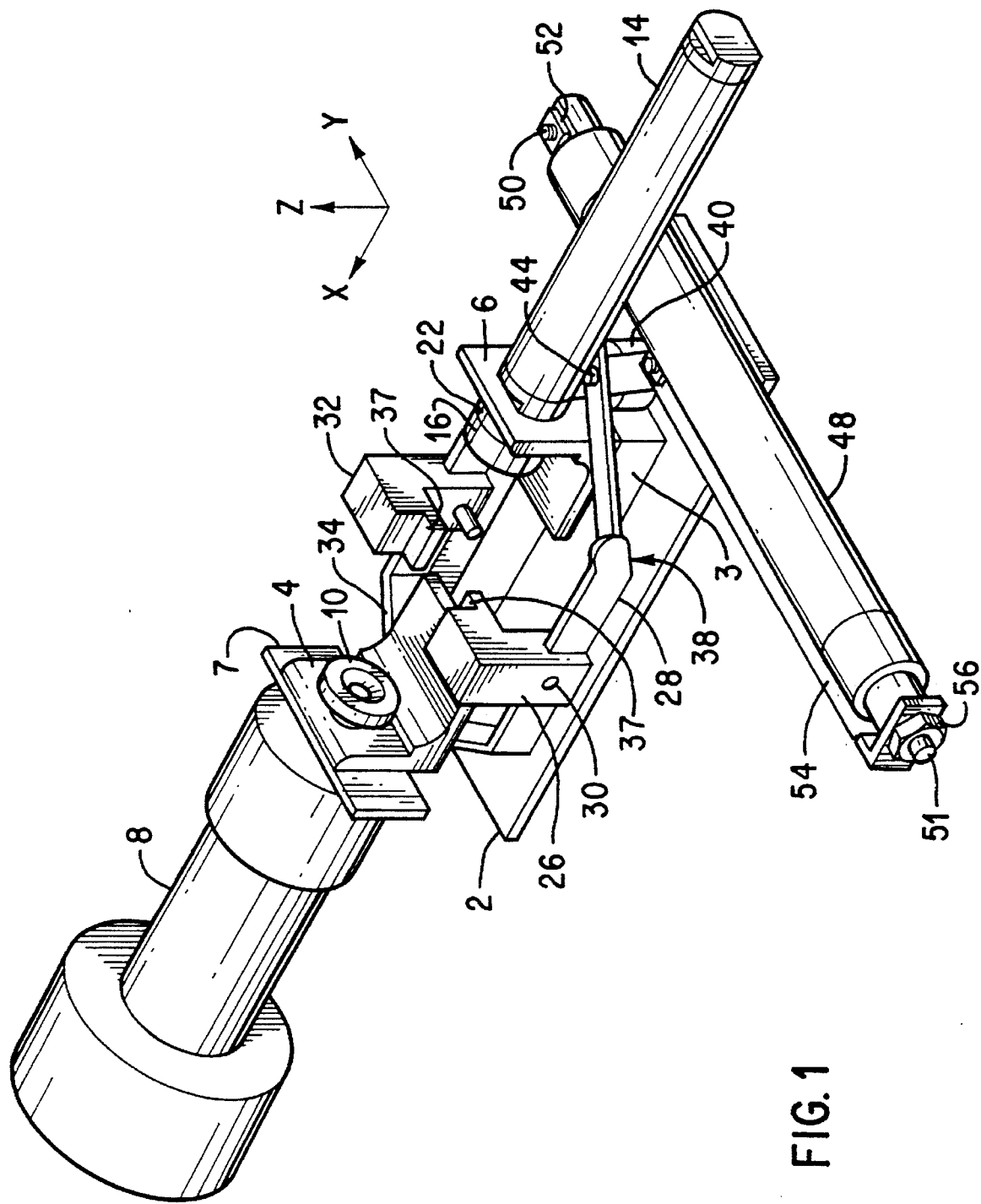
FIG. 1 is a perspective view of an embodiment of the invention.
Figure 2:
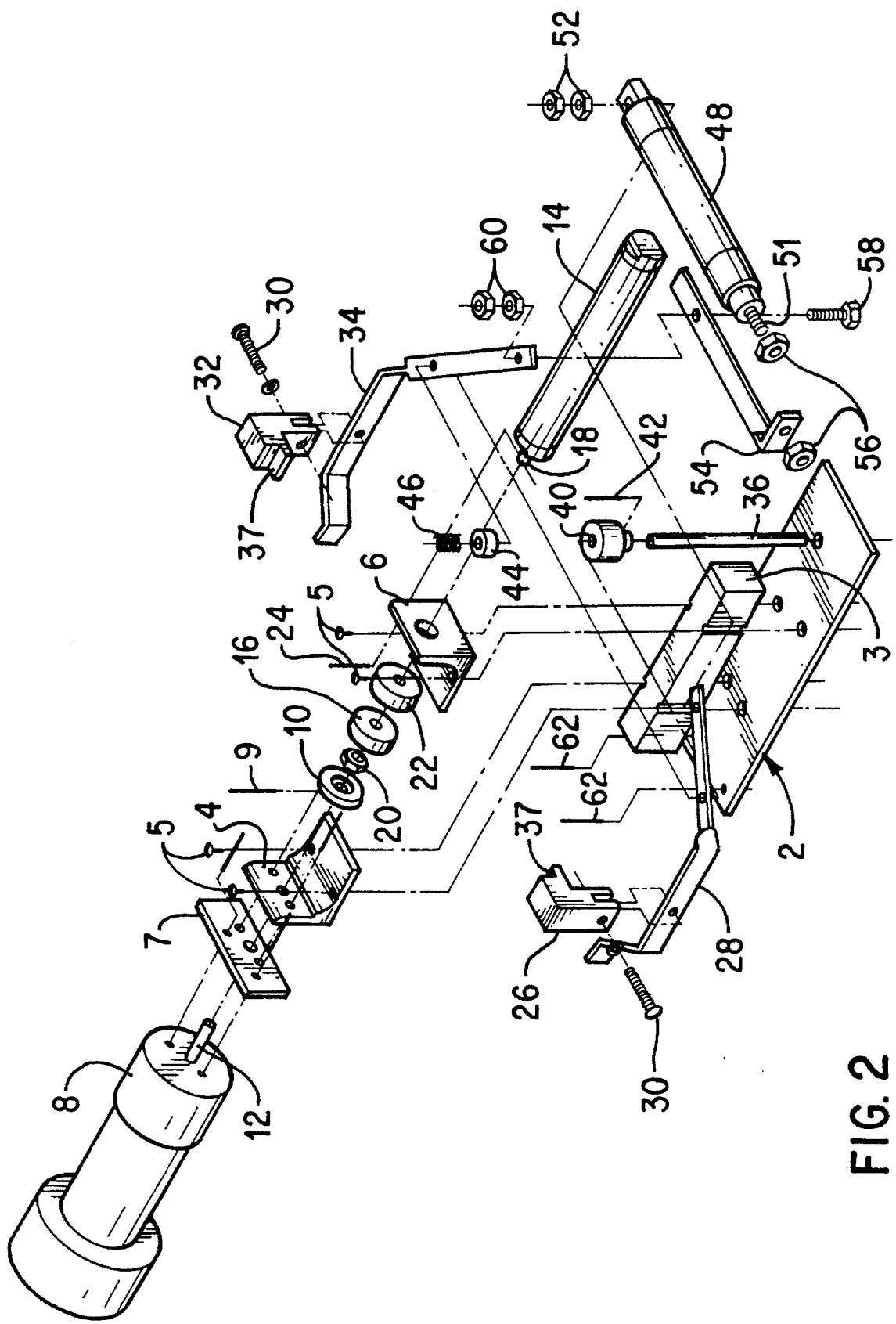
FIG. 2 is an exploded view of the embodiment shown in FIG. 1.

The structure of an embodiment of the invention will be described with reference to the figures. Referring to FIG. 1, the embodiment comprises base plate 2 which supports vertical spacer 3. Motor mount 4 and single acting pneumatic cylinder mount 6 are placed on top of vertical spacer 3 and bolted to base plate 2 via machine bolts 5 (shown in FIG. 2). Motor adapter plate 7 is attached to direct current servo motor 8. Typically, motor 8 is a direct current 12 volt servo motor with a 96 to 1 gear ratio and an output shaft having a 3/16 inch diameter. The motor can be a Pittman Motor Co. model number GM94136608. Motor adapter plate 7 is affixed to motor mount 4 so that motor 8 is positioned above base plate 2. Fixed pressure plate 10 is affixed to rotational shaft 12 (shown is FIG. 2) of motor 8 by roll pin 9 (shown in FIG. 2). Single acting pneumatic cylinder 14 is supported by single acting pneumatic cylinder mount 6. Typically, cylinder 14 can be a ½ inch Bimba stainless steel single action spring return cylinder model number YC 042 with a 2 inch ram length and a ¼ inch ram diameter. Pneumatic cylinder pressure plate 16 is attached to shaft 18 (shown if FIG. 2) of cylinder 14. Pneumatic cylinder pressure plate 16 is held onto shaft 18 by retainer nut 20 (shown in FIG. 2) on one side and by retainer plate 22 on the other side. Retainer plate 22 is affixed to shaft 18 via roll pin 24 (shown in FIG. 2). Pneumatic cylinder pressure plate 16 can freely rotate around shaft 18 (shown in FIG. 2) of cylinder 14 even when pressure is applied to plate 16. Removable alignment jaw 26 is attached to scissor arm 28 via machine bolt 30. Removable alignment jaw 32 is attached to scissor arm 34 via another machine bolt 30 (shown in FIG. 2). Alignment jaws 26 and 32 have flat workpiece support surfaces 37. Scissor arms 28 and 34 are attached together by pin 36 (shown in FIG. 2) to form scissor alignment mechanism 38. Pin 36 allows scissor arms 28 and 34 to freely rotate about pin 36. Pin 36 is affixed to base plate 2. Pin 36 extends through the center of scissor alignment mechanism base spacer 40. Base spacer 40 is attached to pin 36 via roll pin 42 (shown in FIG. 2). Base spacer 40 supports scissor arms 28 and 34. Compression cap 44 holds scissor arms 28 and 34 onto pin 36. Scissor compression spring 46 (shown is FIG. 2) maintains pressure on scissor arms 28 and 34. Double acting pneumatic cylinder 48 is affixed at one end to scissor arm 28 via bolt 50 and retention nuts 52 (shown in FIG. 2). Cylinder 48, typically, can be a ½ inch Bimba stainless steel double action cylinder model number YC 0435-D with a ram length of 3 ½ inches and a ram diameter of ¼ inch. Movable shaft 51 (shown in FIG. 2) of cylinder 48 is affixed to member 54 via retention nuts 56 (shown in FIG. 2). The other end of member 54 is rotationally connected to the end of scissor arm 34 via bolt 58 and retention nuts 60 (shown in FIG. 2).

Figure 3:
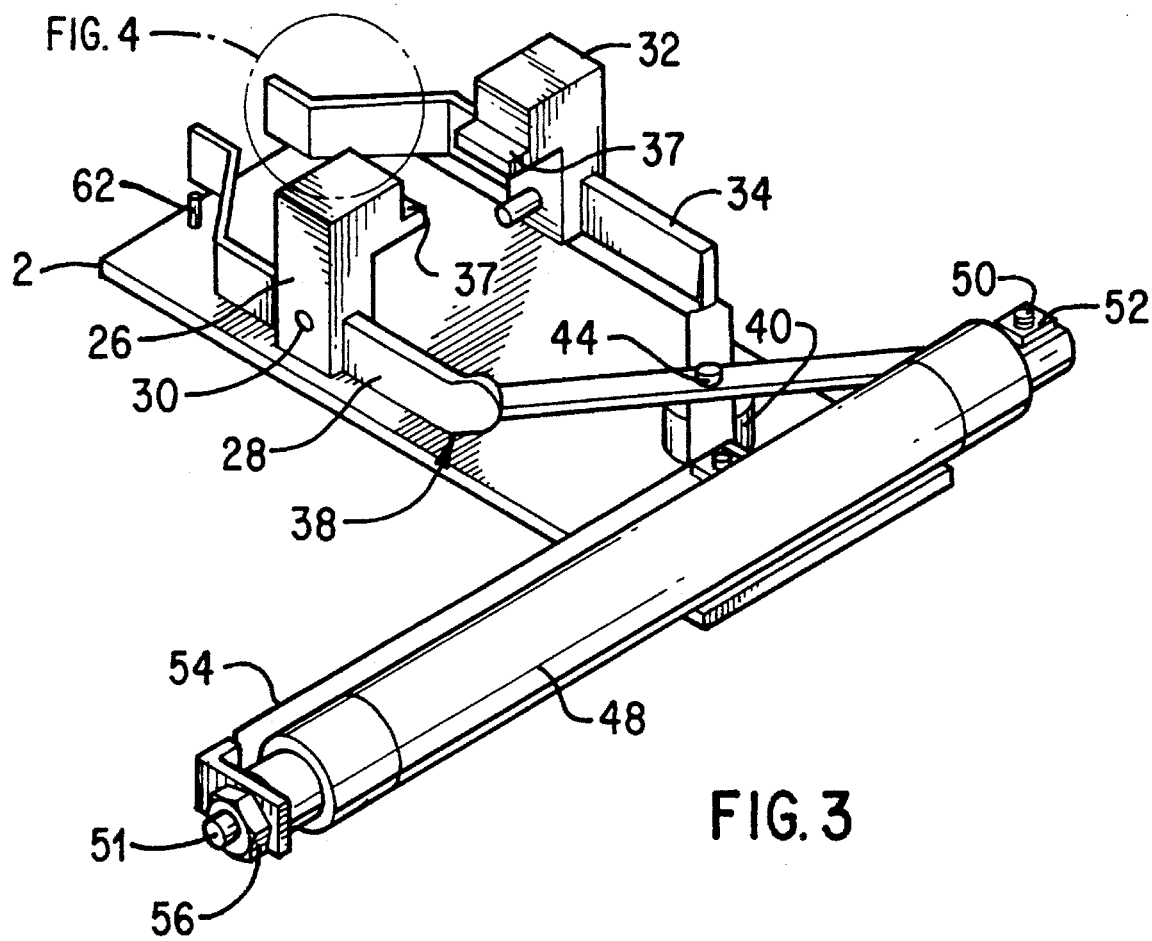
FIG. 3 is a partial perspective view of the embodiment of the invention shown in FIG. 1 which has elements removed to show details not visible in FIG. 1.
Figure 4:
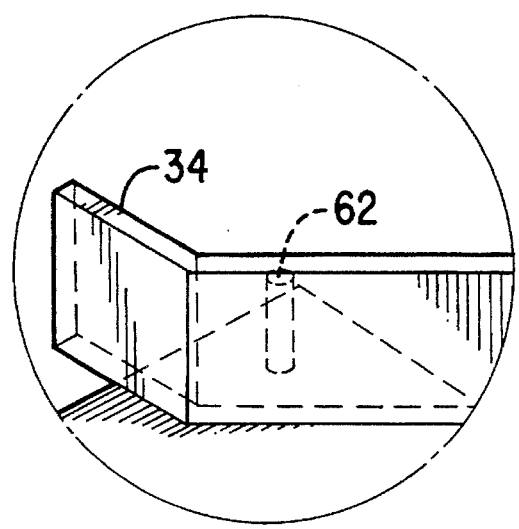
FIG. 4 is an enlargement of a portion of FIG. 3 which shows details not visible in the other drawings.

Referring to FIGS. 3 and 4, scissor stop pins 62, which limit the outward travel of scissor arms 28 and 34 are shown. These pins are typically roll pins which are attached to base plate 2 in a vertical position.

The operation of the above embodiment of the invention will now be described with reference to the figures. Referring to FIG. 1, initially, scissor actuation means in the form of double acting pneumatic cylinder 48 is activated and its shaft 51 is fully extended. This moves member 54 which actuates scissor alignment mechanism 38. Scissor arms 28 and 34 of alignment mechanism 38 pivot about pin 36 (shown is FIG. 2). They move away from one another causing alignment mechanism 38 to be moved to its fully open position. The maximum outward motion of scissor arms 28 and 34 is limited by scissor stop pins 62 (shown is FIGS. 2–4). A workpiece is then placed in the automatic alignment vise by a positioning device such as a robotic machine (not shown). The workpiece does not have to be precisely placed in the automatic alignment vise because the vise will center the workpiece and precisely align it for machining. The workpiece is placed onto flat workpiece support surfaces 37 located on removable alignment jaws 26 and 32. The height of workpiece support surfaces 37 positions the workpiece along the Z-axis. The position of the workpiece along the Z axis can be varied by changing alignment jaws 26 and 32. Different alignment jaws 26 and 32 can be used with flat workpiece support surfaces 37 located at different heights to achieve different Z-axis positioning. Alignment jaws 26 and 32 are each attached to scissor arms 28 and 34, respectively, by a single bolt 30 (shown in FIG. 2). Therefore, alignment jaws with different height workpiece support surfaces 37 can be easily interchanged.

The positioning device then releases its grip on the workpiece. Double acting pneumatic cylinder 48 then retracts its shaft 51 causing scissor arms 28 and 34 of scissor alignment mechanism 38 to pivot about pin 36 (shown in FIG. 2). This results in scissor alignment mechanism 38 closing around the workpiece. The inward movement of scissor arms 28 and 34 of scissor alignment mechanism 38 positions the workpiece in its proper location along the Y-axis in accordance with digital data received from a machining device (not shown) that will machine the workpiece. The machining device can typically be a robotic device or a vertical milling machine. The digital data is provided to double acting pneumatic cylinder 48 to control the movement of the cylinder's shaft 51. This digital data is provided by conventional computer hardware and software (not shown).

After Y-axis alignment of the workpiece by scissor alignment mechanism 38, single acting pneumatic cylinder 14 is activated by digital data received from the machining device that will machine the workpiece. Cylinder 14 extends its shaft 18 (shown in FIG. 2). This causes pneumatic cylinder pressure plate 16, located at the end of shaft 18, to come in contact with the workpiece. Extension of shaft 18 causes cylinder pressure plate 16 to move the workpiece along the X-axis until it contacts fixed pressure plate 10 which is affixed to rotational shaft 12 (shown in FIG. 2) of motor 8. The workpiece is now being held in its proper location along the X-axis by being pressed between cylinder pressure plate 16 and fixed pressure plate 10.

The machining device then provides a digital signal to double acting pneumatic cylinder 48. This signal actuates cylinder 48 and causes its shaft 51 to retract. This results in scissor arms 28 and 34 pivoting around pin 36 (shown in FIG. 2) and thereby moving away from one another. This opens scissor alignment mechanism 38 so that it releases its grip on the workpiece.

The machining device then machines the top face of the workpiece. When machining is completed the machining device moves away from the workpiece. Servo motor 8 is then activated by digital data received from the machining device. Motor 8, in response to this data, rotates its shaft 12 (shown in FIG. 2) which rotates fixed pressure plate 10 which is attached to shaft 12. The workpiece can be freely rotated by motor 8 since it is held under pressure between fixed pressure plate 10 and pneumatic cylinder pressure plate 16. Pneumatic pressure plate 16, as described above, can freely move around shaft 18 (shown in FIG. 2) of cylinder 14 even when pressure is applied to pressure plate 16. Once servo motor 8 has rotated the workpiece around the X-axis to a new position an additional face or portion of the workpiece is positioned for machining by the machining device. The machining device can then machine a new part of the workpiece. Servo motor 8 can repetitively rotate the workpiece until all faces are machined.

The positioning device can then grip the workpiece after which single acting pneumatic cylinder 14 can retract shaft 18 (shown in FIG. 2) in response to a digital signal from the positioning device. Retraction of shaft 18 moves pressure plate 16 away from the workpiece. This releases the contact pressure applied to the workpiece when it was pressed between fixed pressure plate 10 and pneumatic cylinder pressure plate 16. The positioning device can then remove the workpiece from the automatic alignment vise, rotate it 90 degrees around the Z axis, and replace it back onto flat workpiece support surfaces 37 which extend from removable alignment jaws 26 and 32. The automatic alignment vise can then repeat the process of aligning the workpiece for machining. The machining device can then machine the remaining surfaces of the workpiece.

In an alternate embodiment of the invention hydraulic cylinders can be used in place of pneumatic cylinders.

There has thus been shown and described a novel automatic alignment vise which fulfills all the objects and advantages sought. Many changes, modifications, variations, and other uses and applications of the subject invention will become apparent to those skilled in the art upon considering the specification and the accompanying drawings which disclose the preferred embodiments. All such changes, modifications, variations, and other uses and applications within the spirit and scope of the invention are deemed to be covered by this specification which is limited only by the claims which follow.

What is claimed is:

1. An automatic alignment vise, comprising:
   (a) Z-axis means for positioning a workpiece along a Z-axis, wherein said Z-axis means supports said workpiece, and said Z-axis means comprises a plurality of alignment jaws, each of said alignment jaws having surfaces for supporting said workpiece;
   (b) Y-axis means for positioning said workpiece along a Y-axis wherein said Y-axis means, in response to an actuation signal, positions said workpiece supported by said Z-axis means, along said Y-axis without substantially changing said Z-axis position;
   (c) X-axis means for positioning said workpiece along an X-axis, wherein said X-axis means, in response to an actuation signal, positions said workpiece along said X-axis without substantially changing said Z-axis and said Y-axis positions; and
   (d) rotational means for rotating said workpiece around said X-axis, wherein said rotational means, in response to an actuation signal, rotates said workpiece around said X-axis.

2. The automatic alignment vise of claim 1, wherein said Z-axis means comprises a plurality of interchangeable alignment jaws, such that different alignment jaws can be used to position said workpiece in different positions along said Z-axis.

3. The automatic alignment vise of claim 2, wherein each of said alignment jaws has a stepped surface, said stepped surface having a substantially flat lower workpiece support surface, and said lower workpiece support surface of each alignment jaw facing each other.

4. The automatic alignment vise of claim 1, wherein said Y-axis means comprises a scissor alignment mechanism capable of holding said workpiece and moving said workpiece along said Y-axis.

5. The automatic alignment vise of claim 4, wherein said scissor alignment mechanism comprises a plurality of scissor arms pivotally connected together, wherein one end of each scissor arm is connected to scissor actuation means for moving said scissor arms relative to one another, said portion of each of said scissor arms located on the opposite side of said pivot connection from said scissor actuation means supporting said Z-axis means are capable of holding said workpiece and moving said workpiece along said Y-axis.

6. The automatic alignment vise of claim 4, wherein said Z-axis means comprises a plurality of alignment jaws, each of said alignment jaws having surfaces for supporting said workpiece.

7. The automatic alignment vise of claim 6, wherein each of said alignment jaws has a stepped surface, said stepped surface having a substantially flat lower workpiece support surface, and said lower workpiece support surface of each alignment jaw facing each other.

8. The automatic alignment vise of claim 6, wherein said alignment jaws are interchangeable such that different alignment jaws can be used to position said workpiece in different positions along said Z-axis.

9. The automatic alignment vise of claim 5, wherein said scissor actuation means is a pneumatic cylinder.

10. The automatic alignment vise of claim 5, wherein said scissor actuation means is a double acting pneumatic cylinder.

11. The automatic alignment vise of claim 5, wherein said scissor actuation means is a hydraulic cylinder.

12. The automatic alignment vise of claim 1, wherein said X-axis means comprises a pneumatic cylinder.

13. The automatic alignment vise of claim 12, wherein said X-axis means further comprises a pneumatic cylinder pressure plate affixed to said pneumatic cylinder shaft, said pneumatic cylinder pressure plate being positioned to push said workpiece to a location along said X-axis.

14. The automatic alignment vise of claim 13, wherein said X-axis means further comprises a fixed pressure plate which stops the motion of said workpiece along said X-axis in response to action of said pneumatic cylinder pressure plate, whereby said workpiece is pressed between said pneumatic cylinder pressure plate and said fixed pressure plate.

15. The automatic alignment vise of claim 14, wherein said rotational means comprises rotational apparatus affixed to said fixed pressure plate, said fixed pressure being capable of rotating in response to rotation of said rotational apparatus, said pneumatic cylinder pressure plate being capable of freely rotating around said X-axis, whereby rotation of said rotational apparatus rotates said workpiece around said X-axis.

16. The automatic alignment vise of claim 15, wherein said rotational apparatus is a servo motor.

17. An automatic alignment vise, comprising:

(a) a plurality of alignment jaws, each of said alignment jaws having workpiece support surfaces for supporting a workpiece and positioning it along a Z-axis;

(b) a scissor alignment mechanism capable of gripping said workpiece and positioning said workpiece along a Y-axis, wherein said scissor alignment mechanism, in response to an actuation signal, positions said workpiece supported by said alignment jaws along said Y-axis without substantially changing said Z-axis position, said scissor alignment mechanism comprising a plurality of scissor arms pivotally connected, wherein one end of each scissor arm is connected to scissor actuation means for moving said scissor arms relative to one another, said portion of each of said scissor arms located on the opposite side of the pivot connection from said scissor actuation means supporting said alignment jaws, whereby said scissor actuation means upon actuation moves said ends of said scissor arms it is connected to away from each other causing said portion of each of said scissor arms located on the opposite side of the pivot connection from said scissor actuation means to move toward each other and causing said alignment jaws supported by said scissor arms to grip said workpiece and position it along said Y-axis;

(c) X-axis positioning apparatus comprising a linear motion device capable of moving said workpiece along an X-axis in response to an actuation signal without substantially changing said Z-axis and Y-axis positions, wherein said workpiece comes in contact with a fixed pressure plate which stops motion of said workpiece along said X-axis in response to said linear motion device moving said workpiece along said X-axis, whereby said workpiece is pressed between said fixed pressure plate and said linear motion device; and (d) rotational apparatus capable of rotating said workpiece around said X-axis in response to an actuation signal, said rotational apparatus comprising rotating means, affixed to said fixed pressure plate, for rotating said fixed pressure plate around said X-axis, said fixed pressure plate being capable of freely rotating around said X-axis, said rotational apparatus further comprising a linear motion device pressure plate, said linear motion device pressure plate being capable of freely rotating around said X-axis, whereby rotation of said rotational apparatus rotates said workpiece pressed between said fixed pressure plate and said linear motion device pressure plate.

18. The automatic alignment vise of claim 17, wherein said alignment jaws are interchangeable such that different alignment jaws can be used to position said workpiece in different positions along said Z-axis.

19. The automatic alignment vise of claim 17, wherein said scissor actuation means is a pneumatic cylinder.

20. The automatic alignment vise of claim 17, wherein said scissor actuation means is a double acting pneumatic cylinder.

21. The automatic alignment vise of claim 17, wherein said scissor actuation means is a hydraulic cylinder.

22. The automatic alignment vise of claim 17, wherein said linear motion device is a pneumatic cylinder.

23. The automatic alignment vise of claim 17, wherein said linear motion device is a hydraulic cylinder.

24. The automatic alignment vise of claim 17, wherein said rotational apparatus is a servo motor.

* * * * *

UNITED STATES PATENT AND TRADEMARK OFFICE
CERTIFICATE OF CORRECTION

PATENT NO. : 5,489,089

DATED : February 6, 1996

INVENTOR(S) : Vollrath et al.

It is certified that error appears in the above-identified patent and that said Letters Patent is hereby corrected as shown below:

On the Title page, item [54] Title, and in Col. 1, line 1, the title "AUTOMATIC ALIGNMANT VISE" should be changed to read --AUTOMATIC ALIGNMENT VISE--

Signed and Sealed this

Twenty-second Day of October, 1996

Attest:

BRUCE LEHMAN

*Attesting Officer*  *Commissioner of Patents and Trademarks*